3,354,172
TRIAMINOGUANIDINIUM 5-AMINOTETRAZO-
LATE AND ITS PREPARATION
Edward Andrew Takacs, Norwalk, Conn., assignor to American Cyanamid Company, Stamford, Conn., a corporation of Maine
No Drawing. Filed Apr. 12, 1966, Ser. No. 543,487
2 Claims. (Cl. 260—308)

ABSTRACT OF THE DISCLOSURE

The invention relates to triaminoguanidinium 5-aminotetrazolate, i.e.,

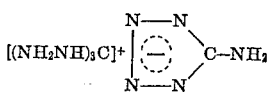

a method for the production thereof which comprises (A) suspending triaminoguanidine in methanol, adding 5-amino-tetrazole thereto, (B) evaporating off the methanol and (C) recrystallizing the resultant residue, and propellant compositions composed of said triaminoguanidinium-5-amino-tetrazolate, an oxidizer and a binder.

---

In accordance with the invention, it has been found that triaminoguanidinium 5-amino-tetrazolate may be prepared in high yield by reacting one mol proportion of the free base, triaminoguanidine, with one mol proportion of 5-amino-tetrazole in the presence of methanol as the reaction medium.

The triaminoguanidine should preferably be weighed out in a dry box in an inert atmosphere and methanol added before exposing it to air and moisture. If the triaminoguanidine is colored, it should preferably be washed with methanol until the solid is white before proceeding with the process. The reaction is conducted at 0–50° C. by suspending the triaminoguanidine in the methanol and adding the solid 5-amino-tetrazole. As the 5-amino-tetrazole is taken up by the reaction, a solution of the triaminoguanidinium 5-amino-tetrazolate product is formed. The product is isolated by evaporating the solution to dryness and recrystallizing the residue from methanol-ether.

The following example is set forth for purposes of illustration only and are not to be construed as limiting the instant invention except as set forth in the appended claims. All parts and percentages are by weight unless otherwise specified.

EXAMPLE 1

*Preparation of triaminoguanidinium 5-aminotetrazolate*

To a suspension of 49.97 parts (0.48 mole) of triaminoguanidine in 1000 parts of absolute methanol is added, with stirring to avoid a rapid increase in temperature, 49.48 parts (0.48 mole) of 5-amino-tetrazole monohydrate. Complete solution results after about fifteen minutes of stirring. The solution is water-white to light cream in color. The solution is then filtered and the solvent evaporated from the filtrate under reduced pressure leaving 90.98 parts (95% yield) of a cream colored, crystalline solid; M.P. 115–128° C. The crude triaminoguanidinium 5-aminotetrazolate is recrystallized from methanol at room temperature by the addition of diethylether; M.P. 141–143° C. The recrystallized material which is a hemi-hydrate, is heated at about 80° C. over $P_2O_5$ under vacuum for 18 hours to remove the water; M.P. 141–142° C.

*Analysis.*—Calc'd for $C_2H_{11}N_{11}$: C, 12.69; H, 5.87; N, 81.44. Found: C, 12.97; H, 5.53; N, 81.55.

The triaminoguanidinium 5-aminotetrazolate possesses properties which make it highly useful as a component in both solid and hybrid rocket propellant fuel compositions. For example, it combines the properties of high stability and large gas-forming capability, thereby resulting, when mixed with various oxidizers, etc., in a propellant of unusually high specific impulses. Furthermore, it has a high nitrogen content (81%), is stable in air and shows no measurable impact or electrical sensitivity. It also shows no thermal sensitivity (instability) below 130° C. and is mildly hygroscopic.

A propellant grain which has been prepared using triaminoguanidinium 5-aminotetrazolate as an additive has shown strengths (stress) as high as 207 p.s.i. at 51% elongation (strain). This propellant grain consisted of a 3:1 mixture of triaminoguanidinium 5-aminotetrazolate and a polymer binder containing 8.0% ethylene dihydrazine as a curing agent. Physically it is a hard, tough, pliable composition.

The relative stability of triaminoguanidinium 5-aminotetrazolate makes it more desirable as a high nitrogen additive than other compounds used previously and it is comparable to known additives in its gas-forming capability.

The triaminoguanidinium 5-aminotetrazolate can be employed as an ingredient in propellant compositions in accordance with general procedures well known to those skilled in the art. Conventional oxidizers such as nitric acid, oxygen, ammonium perchlorate, potassium perchlorate, sodium perchlorate, ammonium nitrate, etc may be used. One would generally use from about 1–35% of the tetrazolate in the composition in finely divided form. Examples of the artificial binders which may be used include polybutadiene-carboxylic acids, nitrocellulose, polyesters, polyurethanes, and the like. These binders are generally used in amounts ranging from about 20–40%, by weight, based on the weight of oxidizer and tetrazolate. Additionally, one can add such fuels as aluminum, beryllium, boron and the like to the propellant compositions. Further details concerning the production and formulation of such compositions can be found in U.S. Patents Nos. 2,622,277, 2,646,596 and 3,132,978, which patents are hereby incorporated herein by reference.

I claim:
1. The compound triaminoguanidinium 5 - aminotetrazolate.
2. A process for preparing the compound of claim 1 which comprises the steps of:
   (1) forming a suspension of triaminoguanidine in methanol;
   (2) adding 5-amino-tetrazole to said suspension whereby a solution of the resulting triaminoguanidine 5-amino-tetrazolate in the methanol is formed;
   (3) evaporating off the methanol from said solution; and
   (4) recrystallizing the residue from step (3).

References Cited

UNITED STATES PATENTS 3,055,911   9/1962   Finnegan et al. _____ 260—308
3,096,312   7/1963   Henry _____ 149—109 X ALTON D. ROLLINS, *Primary Examiner.*

CARL D. QUARFORTH, L. DEWAYNE RUTLEDGE,
*Examiners.*

L. A. SEBASTIAN, *Assistant Examiner.*